US011490363B2

(12) United States Patent
Wang et al.

(10) Patent No.: US 11,490,363 B2
(45) Date of Patent: Nov. 1, 2022

(54) USER DEVICE-INITIATED BANDWIDTH REQUEST

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 487 days.

(21) Appl. No.: 15/956,632

(22) Filed: Apr. 18, 2018

(65) Prior Publication Data
US 2019/0327715 A1 Oct. 24, 2019

(51) Int. Cl.
*H04W 72/02* (2009.01)
*H04W 72/04* (2009.01)
*G06F 11/30* (2006.01)

(52) U.S. Cl.
CPC ......... *H04W 72/02* (2013.01); *H04W 72/048* (2013.01); *H04W 72/0453* (2013.01); *G06F 11/3058* (2013.01)

(58) Field of Classification Search
CPC ............... H04W 72/02; H04W 72/048; H04W 72/0453; H04W 28/20; G06F 11/3058
See application file for complete search history.

(56) References Cited

U.S. PATENT DOCUMENTS

| | | | |
|---|---|---|---|
| 7,173,245 B2 * | 2/2007 | Shakouri | G01J 5/0802 250/339.1 |
| 7,969,949 B2 | 6/2011 | Liu et al. | |
| 8,649,313 B2 | 2/2014 | Lin et al. | |
| 9,544,902 B1 * | 1/2017 | Narendran | H04W 72/048 |
| 9,854,510 B2 | 12/2017 | Pasupuleti et al. | |
| 10,218,422 B2 | 2/2019 | Raghavan et al. | |
| 10,609,681 B2 | 3/2020 | Wang et al. | |
| 11,425,688 B2 | 8/2022 | Wang et al. | |
| 2005/0089064 A1 | 4/2005 | Zimmerman et al. | |

(Continued)

FOREIGN PATENT DOCUMENTS

| | | |
|---|---|---|
| WO | 2018030710 | 2/2018 |
| WO | 2019125234 | 6/2019 |

(Continued)

OTHER PUBLICATIONS

Lien, et al., "5G New Radio: Waveform, frame structure, multiple access, and initial access", IEEE Communications Magazine (vol. 55, Issue: 6, 2017), Jun. 12, 2017, 8 pages.

(Continued)

*Primary Examiner* — Khaled M Kassim
*Assistant Examiner* — Kai Chang
(74) *Attorney, Agent, or Firm* — Colby Nipper PLLC

(57) ABSTRACT

The present disclosure describes techniques and systems for user device-initiated bandwidth requests. In some aspects, a user device determines conditions related to communicating with a base station over a wireless connection. The user device selects, based on the determined conditions, a frequency bandwidth for communicating with the base station. The user device then transmits, to the base station, a request to communicate over the selected frequency bandwidth. In some implementations, the user device may receive, in response to transmitting the request, a resource grant allocating at least a portion of the selected frequency bandwidth for communicating over the wireless connection.

23 Claims, 9 Drawing Sheets

(56) References Cited

U.S. PATENT DOCUMENTS

| | | | |
|---|---|---|---|
| 2008/0025341 A1* | 1/2008 | Rao | H04W 72/048 370/468 |
| 2008/0056183 A1 | 3/2008 | Gorokhov et al. | |
| 2010/0255850 A1* | 10/2010 | Kaukoranta | H04W 72/1268 455/450 |
| 2012/0082120 A1 | 4/2012 | Chun et al. | |
| 2012/0307744 A1 | 12/2012 | Charbit et al. | |
| 2015/0139080 A1 | 5/2015 | Ellenbeck et al. | |
| 2015/0282148 A1* | 10/2015 | Le | H04W 72/0406 370/329 |
| 2015/0334716 A1 | 11/2015 | Coffman | |
| 2015/0351098 A1 | 12/2015 | Schellmann et al. | |
| 2016/0029248 A1* | 1/2016 | Syed | H04W 28/08 370/235 |
| 2016/0352551 A1 | 12/2016 | Zhang et al. | |
| 2017/0006606 A1 | 1/2017 | Matsuo et al. | |
| 2017/0164350 A1 | 6/2017 | Sun et al. | |
| 2017/0188352 A1 | 6/2017 | Lee et al. | |
| 2017/0202009 A1 | 7/2017 | Kim et al. | |
| 2017/0208591 A1 | 7/2017 | Alvarino et al. | |
| 2017/0265182 A1 | 9/2017 | Guo et al. | |
| 2017/0290013 A1 | 10/2017 | McCoy et al. | |
| 2017/0311326 A1 | 10/2017 | Wong et al. | |
| 2017/0331577 A1 | 11/2017 | Parkvall et al. | |
| 2018/0049047 A1 | 2/2018 | Lin et al. | |
| 2018/0049227 A1 | 2/2018 | Moon et al. | |
| 2018/0077708 A1 | 3/2018 | Lepp et al. | |
| 2018/0083817 A1 | 3/2018 | Salem et al. | |
| 2018/0084539 A1* | 3/2018 | Kubota | H04W 76/16 |
| 2018/0146480 A1* | 5/2018 | Chendamarai Kannan | H04W 72/0413 |
| 2018/0160427 A1* | 6/2018 | Ravishankar | H04L 69/18 |
| 2018/0183552 A1 | 6/2018 | Hosseini et al. | |
| 2018/0192329 A1* | 7/2018 | Medapalli | H04W 28/20 |
| 2018/0198649 A1* | 7/2018 | Lindoff | H04L 27/264 |
| 2018/0206246 A1 | 7/2018 | Zhang et al. | |
| 2018/0219649 A1 | 8/2018 | Ying et al. | |
| 2018/0270700 A1 | 9/2018 | Babaei et al. | |
| 2018/0270798 A1 | 9/2018 | Park et al. | |
| 2018/0278309 A1* | 9/2018 | Raghavan | G06F 1/206 |
| 2018/0278386 A1 | 9/2018 | Shim et al. | |
| 2018/0279310 A1* | 9/2018 | Chen | H04L 5/001 |
| 2018/0279359 A1 | 9/2018 | LIU et al. | |
| 2018/0279360 A1 | 9/2018 | Park et al. | |
| 2018/0288746 A1 | 10/2018 | Zhang et al. | |
| 2018/0310308 A1 | 10/2018 | Loehr et al. | |
| 2018/0324786 A1 | 11/2018 | Hooli et al. | |
| 2018/0343153 A1 | 11/2018 | Zhang et al. | |
| 2018/0352559 A1* | 12/2018 | Duet | H04W 72/1231 |
| 2018/0367255 A1 | 12/2018 | Jeon et al. | |
| 2019/0081842 A1 | 3/2019 | Kim et al. | |
| 2019/0120933 A1* | 4/2019 | Kurashige | G01S 7/4008 |
| 2019/0132862 A1* | 5/2019 | Jeon | H04W 72/14 |
| 2019/0174513 A1 | 6/2019 | Loehr et al. | |
| 2019/0260533 A1 | 8/2019 | Manolakos et al. | |
| 2019/0268920 A1 | 8/2019 | Falahati et al. | |
| 2019/0281606 A1 | 9/2019 | Liu et al. | |
| 2019/0297489 A1 | 9/2019 | Lei et al. | |
| 2019/0327716 A1 | 10/2019 | Wang et al. | |
| 2019/0342902 A1 | 11/2019 | Wu et al. | |
| 2020/0022160 A1 | 1/2020 | Zou et al. | |
| 2020/0187164 A1 | 6/2020 | Wang et al. | |
| 2020/0267753 A1 | 8/2020 | Adjakple et al. | |

FOREIGN PATENT DOCUMENTS

| | | |
|---|---|---|
| WO | 2018130115 | 7/2019 |
| WO | 2019209390 | 10/2019 |

OTHER PUBLICATIONS

"International Search Report and Written Opinion", PCT Application No. PCT/US2019/019758, dated May 15, 2019, 14 pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
Wu, "Handling Overheating in a Wireless-Communication Device", Technical Disclosure Commons; Retrieved from https://www.tdcommons.org/dpubs_series/2343, Jul. 12, 2019, 22 pages.
"Enhancements to SR in NR", 3GPP TSG-RAN WG2 Meeting #98, Hangzhou, China, May 15-19, 2017, 4 pages.
"First Action Interview Office Action", U.S. Appl. No. 15/961,672, dated Aug. 1, 2019, 4 pages.
"Granularity of SR Configurations", 3GPP TSG-RAN WG2 Meeting NR ad-hoc 2; R2-1706519; Qingdao, China, Jun. 27 -29, 2017, 3 pages.
"International Preliminary Report on Patentability", PCT Application No. PCT/US2019/019758, dated Jun. 26, 2020, 15 pages.
"International Preliminary Report on Patentability", PCT Application No. PCT/US2019/014327, dated Jun. 26, 2020, 23 pages.
"International Search Report and Written Opinion", PCT Application No. PCT/US2019/014327, dated Jun. 14, 2019, 25 pages.
"Invitation to Pay Additional Fees", PCT Application No. PCT/US2019/014327, dated Dec. 19, 2019, 3 pages.
"Invitation to Pay Additional Fees", PCT Application No. PCT/US2019/014327, dated Mar. 19, 2019, 12 pages.
"Notice of Allowance", U.S. Appl. No. 15/961,672, dated Feb. 28, 2020; 13 Pages.
"Pre-Interview Communication", U.S. Appl. No. 15/961,672, dated Jun. 6, 2019, 4 pages.
"Remaining Issues on LCP with Multiple Numerologies", 3GPP TSG-RAN WG2 #98; R2-1705624; Hangzhou, China, , May 2017, 3 pages.
"Scheduling Request Design in NR System", 3GPP TSG RAN WG1 Meeting #90; R1-1713951; Prague, Czechia, Aug. 21-25, 2017, 3 pages.
"Search Report", IQ.IP.com search conducted May 28, 2019, dated May 28, 2019, 4 pages.
"Written Opinion of the International Preliminary Examining Authority", PCT Application No. PCT/US2019/014327, dated Feb. 21, 2020, 9 pages.
"Written Opinion of the International Preliminary Examining Authority", PCT Application No. PCT/US2019/019758, dated Mar. 18, 2020, 6 pages.
"Extended European Search Report", EP Application No. 21182178.0, dated Sep. 21, 2021, 9 pages.
"Final Office Action", U.S. Appl. No. 16/788,812, filed Jan. 24, 2022, 24 pages.
"Foreign Office Action", IN Application No. 202047034433, dated Aug. 26, 2021, 6 pages.
"Non-Final Office Action", U.S. Appl. No. 16/788,812, filed Aug. 3, 2021, 21 pages.
"Notice of Allowance", U.S. Appl. No. 16/788,812, filed Jun. 24, 2022, 10 pages.

* cited by examiner

USER DEVICE-INITIATED BANDWIDTH REQUEST

BACKGROUND

Generally, a provider of a wireless network manages wireless communications over the wireless network. For example, a base station manages wireless communications with a user device associated with the wireless network. The provider of the wireless network receives a request to communicate, determines a schedule for the communication, and transmits the schedule to a user device that transmitted the request. The user device then follows the schedule to transmit to, and receive data from, the provider. This process is effective to manage wireless connections with several user devices, particularly when the provider manages a conventional wireless network having a relatively narrow total bandwidth allocation and static wireless connection bandwidth allocations.

With recent advances in wireless communication technology, providers manage a relatively broad total frequency allocation and can dynamically adjust a bandwidth for individual wireless connections. This allows the provider to tailor communication with associated user devices and to associate with an increase quantity of user devices. However, these advances can provide new challenges for the associated user devices.

SUMMARY

This document describes techniques for, and systems that enable, user device-initiated bandwidth requests. Advances in wireless communication technology allow a provider to access a broader range of bandwidth for allocating communication resources to associated user devices. Additionally, the advances allow an increased amount of bandwidth that can be allocated for individual wireless connections with individual user devices. This allows for communicating greater volumes of data over a time interval, which can improve a user experience. However, conditions may exist which would make a frequency bandwidth preferable over another frequency bandwidth. In many instances, these conditions are undetected by the provider. These conditions may include one or more of a power status of the user device, a thermal status of the user device, other wireless signals at the user device, or an amount or type of data to be communicated over the wireless connection. Therefore, in the context of user device-initiated bandwidth requests, a user device can detect these conditions, select a frequency bandwidth for communicating with the base station providing the network, and transmit the selected frequency bandwidth to the base station. This can improve an experience at the user device by allowing the user device to influence a frequency bandwidth allocation better suited for communication over the wireless connection.

In some aspects, a user device determines conditions related to communicating with a base station over a wireless connection. The user device selects, based on the determined conditions, a frequency bandwidth for communicating with the base station. The user device then transmits, to the base station, a request to communicate over the selected frequency bandwidth. In some implementations, the user device may receive, in response to transmitting the request, a resource grant allocating at least a portion of the selected frequency bandwidth for communicating over the wireless connection.

In other aspects, a user device includes a processor, a hardware-based transceiver, and a computer-readable storage medium having instructions stored thereon. Responsive to execution of the instructions by the processor, the processor performs operations relating to user device-initiated bandwidth requests. The operations include establishing, via the hardware-based transceiver, a wireless connection with a base station of a wireless network. The operations also include receiving, via the hardware-based transceiver, a resource grant from the base station. The resource grant identifies a frequency bandwidth for communicating with the base station over the wireless connection. The operations further include determining conditions related to communicating with a base station over the frequency bandwidth identified in the resource grant. The operations then include selecting, based on the determined conditions, another frequency bandwidth for communicating with the base station and the transmitting a request to communicate over the other frequency bandwidth to the base station.

In further aspects, a base station includes a processor, one or more hardware-based transceivers, and a computer-readable storage medium having instructions stored thereon. Responsive to execution of the instructions by the processor, the processor performs operations relating to user device-initiated bandwidth requests. The operations include receiving, from a user device, a request to communicate over a wireless connection, with the request including a selected frequency bandwidth. The operations also include comparing the request with an availability of communication resources within the selected frequency bandwidth. The operations further include transmitting, to the user device and via the one or more hardware-based transceivers, a resource grant allocating communication resources for communicating with the base station over the wireless connection. The resource grant is based on the request and comparing the request with the availability of communication resources within the selected frequency bandwidth.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of user device-initiated bandwidth requests for wireless networks is described below. The use of the same reference numbers in different instances in the description and the figures indicate similar elements.

DETAILED DESCRIPTION

Figure 1:
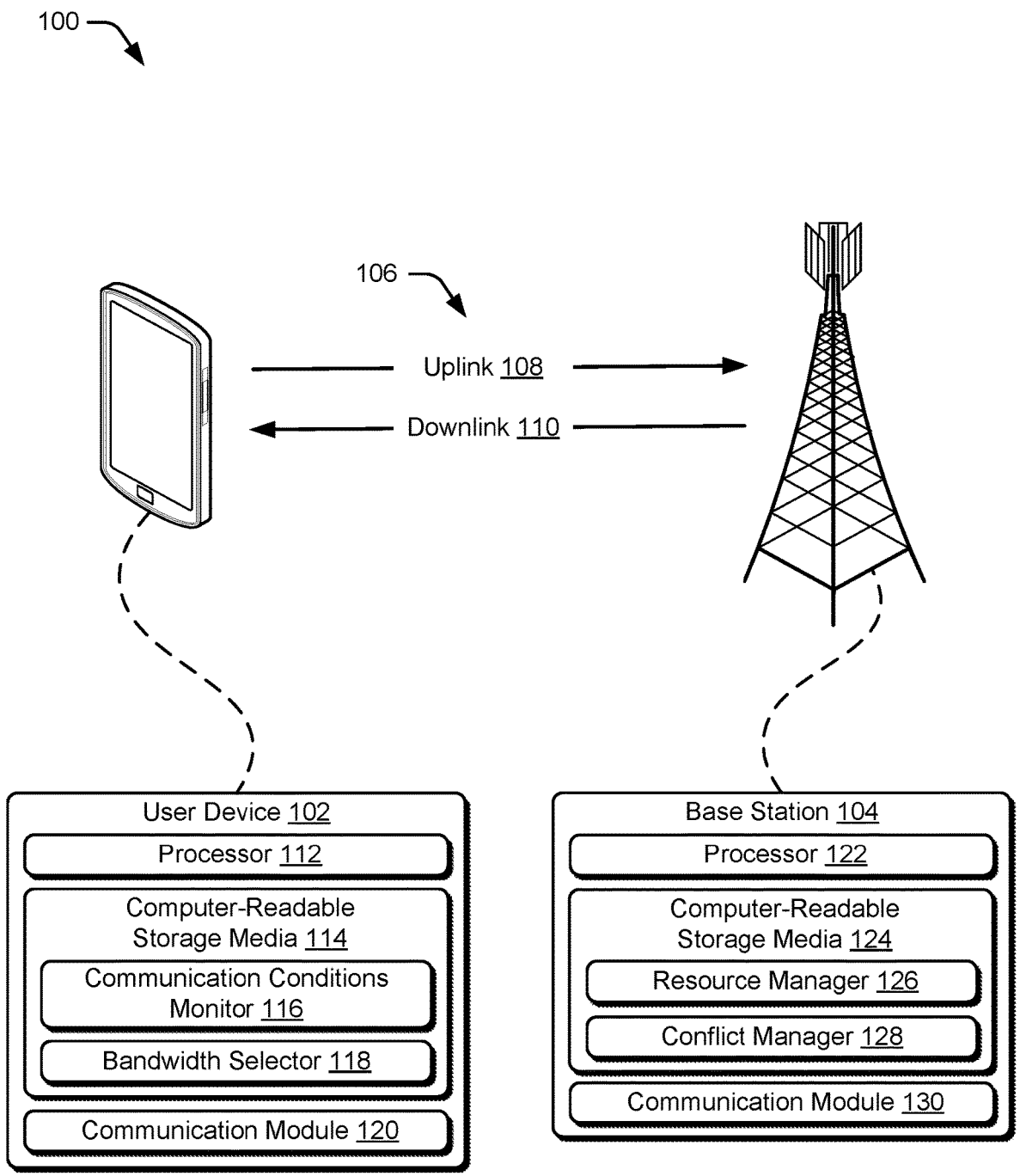
FIG. 1 illustrates example device configurations of a user device and a base station in accordance with one or more aspects of user device-initiated bandwidth requests.

Base stations of wireless networks manage wireless connections with user devices by scheduling communication resources for communicating with the user devices. Recent advances in wireless communication technology allow a base station to allocate an increased amount of bandwidth, relative to conventional technology, to user devices associated with the base station through wireless connections. Additionally, the recent advances allow for a broader total bandwidth of the wireless network, which allows the base station to disperse allocations of communication resources over a relatively wide frequency bandwidth, relative to conventional technology. However, based on conditions at the user device, an amount of frequency bandwidth allocation or a frequency location of the bandwidth allocation may be preferred by the user device.

This document describes techniques and systems for user device-initiated bandwidth requests. User device-initiated bandwidth requests includes a user device determining conditions for communicating with the base station, selecting a preferred frequency bandwidth for communicating, and transmitting a request to the base station for communicating over the selected frequency bandwidth. The conditions may be, for example, environmental conditions or internal conditions of the user device.

In an illustrative implementation, a user device communicates with a base station over a wireless connection. The user device detects one or more WiFi signals in an environment at the user device. The WiFi signals are operating at frequency bandwidths around 2.4 GHz and 5 GHz. Based on this condition, the user device determines that it prefers to communicate with the base station at a frequency bandwidth that will reduce interference with the WiFi signals. Additionally, the user device determines that an internal temperature is near an upper limit of safe operating temperatures. Based on this condition, the user device determines that it prefers to communicate with the base station at a frequency bandwidth that is narrower than a standard frequency bandwidth. The user device may additionally determine to communicate at a frequency bandwidth located at a low frequency bandwidth that will not draw high power and cause increased heat for transmitting. The user device then selects a frequency bandwidth based on these conditions. For example, the user device may select a frequency bandwidth that is 50 MHz wide and located between 3 GHz and 4.5 GHz. Alternatively, the user device may select a frequency that is 30 MHz wide with an exclusion of frequency bandwidths between 2.2 GHz and 2.6 GHz, 4.5 GHz and 5.5 GHz, and over 20 GHz. The user device then transmits a request to the base station, with the request identifying the selected frequency bandwidth. Based on the request, the base station allocates communication resources for communicating with the user device and transmits a resource grant identifying the allocated communication resources.

The following discussion describes an operating environment and techniques that may be employed in the operating environment and/or network environment. In the context of the present disclosure, reference is made to the operating environment or networking environment by way of example only.

Operating Environment

FIG. 1 illustrates an example operating environment 100 in which devices for user device-initiated bandwidth requests can be implemented. In this example, the operating environment includes a user device 102 and a base station 104 that are respectively configured to communicate over a wireless connection 106 of a wireless network. Generally, the wireless connection 106 includes an uplink 108 by which the user device 102 transmits data to the base station 104 and a downlink 110 by which the base station 104 transmits other data to the user device 102, such as application data or grants for further communications. Although shown or described with reference to a separate uplink 108 or downlink 110, communication between the user device 102 and base station 104 may also be referenced as a wireless association, a frame exchange, a wireless link, or a communication link.

The wireless connection 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, a long-term evolution (LTE) protocol, an LTE Advanced protocol, a 5' Generation (5G) New Radio (NR) protocol, or a future advanced protocol. The protocol may operate based on frequency division duplexing (FDD) or time division duplexing (TDD). The wireless connection 106 may operate over a dynamic frequency bandwidth that can range from a high frequency bandwidth, such as a frequency bandwidth greater than 1 GHz, to a low frequency bandwidth, such as 2 MHz. Further, the wireless connection 106 may be configured to allow for operation at high frequencies, such as frequencies above 3 GHz, as well as lower frequencies, such as those between 0.5 GHz and 3 GHz.

The user device 102 includes a processor 112, computer-readable storage media (CRM) 114 having a communication conditions monitor 116 and a bandwidth selector 118, and a communication module 120. The user device 102 is illustrated as a smart phone, however the user device 102 may instead be implemented as any device with wireless communication capabilities, such as a mobile gaming console, a tablet, a laptop, an advanced driver assistance system (ADAS), a point-of-sale (POS) terminal, a health monitoring device, an unmanned aircraft, a camera, a media-streaming dongle, a wearable smart-device, an internet-of-things (IoT) device, a personal media device, a navigation device, a mobile-internet device (MID), a wireless hotspot, a femto-cell, a smart vehicle, or a broadband router.

The processor 112 of the user device 102 can execute processor-executable instructions or code stored by the CRM 114 to cause the user device 102 to perform operations or implement various device functionalities. In this example, the CRM 114 also stores processor-executable code or instructions for implementing one or more of the communication conditions monitor 116 or the bandwidth selector 118 of the user device 102. The communication conditions monitor 116 or the bandwidth selector 118 may be implemented as modules including one or more of hardware or software.

A processor, such as the processor 112, can be implemented as an application processor (e.g., multicore processor) or a system-on-chip with other components of the user device 102 integrated therein. A CRM, such as the CRM 114, may include any suitable type of memory media or storage media, such as read-only memory (ROM), programmable ROM (PROM), random access memory (RAM), static RAM (SRAM), or Flash memory. In the context of this discussion, a CRM is implemented as hardware-based storage media, which does not include transitory signals or carrier waves. In some cases, a CRM stores one or more of firmware, an operating system, or applications of an associated device as instructions, code, or information. The instructions or code can be executed by an associated processor to implement various functionalities of the associated device, such as those related to network communication.

In some aspects, the communication conditions monitor 116 monitors conditions, such as internal and environmental conditions that may impact communicating over the wireless connection 106 on different frequency bandwidths. Internal conditions may include one or more of a thermal status of the user device 102, a power status of the user device 102, or an amount or type of data to be transmitted to or received from the base station 104. Environmental conditions may include, for example, a microwave oven operating around 2.4 GHz, a WiFi router communicating over a frequency bandwidth around 5 GHz, another nearby user device communicating at another frequency bandwidth, or an obstruction likely to reflect high-frequency transmissions.

The bandwidth selector 118 determines, based on the monitored conditions, one or more preferred frequency bandwidths for communicating with the base station 104. The bandwidth selector 118 may select a preferred frequency bandwidth as one or more ranges of preferred frequencies or one or more ranges of excluded frequencies. Additionally or alternatively, the bandwidth selector 118 may select an amount of communication resources within the preferred frequency bandwidth that may be less than all communication resources in the selected frequency bandwidth. Additionally or alternatively, the bandwidth selector 118 may select configuration parameters for communication resources.

Using the communication module 120, the user device 102 then transmits a request to communicate with the base station 104 over the selected frequency bandwidth. The user device 102 may transmit the request as a radio resource control (RRC) message or a medium access control (MAC) message. Further, the user device 102 may transmit the request over currently allocated communication resources, a physical random access channel (PRACH), a supplemental uplink, or an uplink of another radio access technology. The request may specify one or both of a selected frequency bandwidth or an amount of communication resources for the downlink 110 only, the uplink 108 only, or both the uplink 108 and the downlink 110. For example, the request may specify increasing or decreasing an amount of communication resources allocated to one or both of the uplink 108 or the downlink 110. The request may further include a requested hopping pattern such that the base station 104 and the user device 102 agree on a planned change in a location of the frequency bandwidth to avoid fading. Additionally or alternatively, the request may include a requested schedule for changing elements of the selected frequency bandwidth, such as an amount of allocated communication resources or a location of the selected frequency bandwidth.

The communication module 120 of the user device 102 includes a hardware-based transceiver and associated circuitry or other components for communicating with the base station 104 via a wireless medium. For example, the communication module 120 may transmit, via a transmitter of the transceiver, data to the base station 104 over one or more channels of the uplink 108, such as a PRACH, a physical uplink control channel (PUCCH), or a physical uplink share channel (PUSCH). This data transmitted to the base station 104 may include any suitable type of framed or packetized information, such as a sounding reference signal (SRS), device status information, wireless connection status information, wireless connection control information, data requests, application data, or network access requests. The communication module 120 may also receive, via a receiver of the transceiver, other data from the base station 104 over one or more channels of the downlink 110, such as a physical downlink control channel (PDCCH), a physical downlink share channel (PDSCH), or a physical hybrid automatic repeat request (HARQ) indicator channel (PHICH). This data may include one or more of application data, downlink pilots, primary or secondary synchronization signals (PSSs or SSSs), a master information block (MIB), a system information block (SIB), a downlink control information (DCI) message, a downlink grant, an uplink grant, wireless connection configuration settings, network control information, or a communication mode selection.

In this example, the base station 104 is shown generally as a cellular base station of a wireless network. The base station 104 may be implemented to provide and manage a cell of a wireless network that includes multiple other base stations that each manage another respective cell of the wireless network. As such, the base station 104 may communicate with a network management entity or others of the multiple base stations to coordinate connectivity or handoffs of mobile stations within or across the cells of the wireless network.

The base station 104 can be configured as any suitable type of base station or network management node, such as a GSM base station, a node base (Node B) transceiver station (e.g., for UMTS), an evolved NodeB (eNB, e.g., for LTE), or a next generation Node B (gNB, e.g., for 5G NR). As such, the base station 104 may control or configure parameters of the uplink 108 or the downlink 110 in accordance with one or more of the wireless standards or protocols described herein.

The base station 104 includes a processor 122, a computer-readable storage media (CRM) 124 having a resource manager 126 and a conflict manager 128, and a communication module 130. In this example, the CRM 124 also stores processor-executable code or instructions for implementing the resource manager 126 and the conflict manager 128 of the base station 104. The resource manager 126 and the conflict manager 128 may be implemented as modules including one or more of hardware or software.

In some aspects, the resource manager 126 of the base station 104 is implemented to perform various functions associated with allocating physical access (e.g., resource blocks) or communication resources available to the base station 104. The physical access, such as an air interface of the base station 104, may be partitioned or divided into various units (e.g., frames) of one or more of frequency bandwidth, time, symbols, or spatial layers. For example, within a framework of a 5G NR protocol, the resource manager 126 can allocate frequency bandwidth and time intervals of access in resource blocks, each of which may be allocated in whole, or in part, to one or more channels for communicating with the user device 102. The resource blocks may include multiple subcarriers, each of which spans a portion of a frequency domain of the resource blocks. These subcarriers may be spaced according to a configuration by the resource manager 126. The subcarriers may be further divided into resource elements, or OFDM symbols, each of which spans a portion of a time domain of the subcarriers. Consequently, a resource block includes multiple OFDM symbols that can be grouped into subcarriers with other OFDM symbols having a common frequency.

In some aspects, the conflict manager 128 receives the request to communicate with the base station 104 over the selected frequency bandwidth via the communication module 130. The conflict manager 128 compares the request with an availability of communication resources within the selected frequency bandwidth. If an amount of available communication resources within the selected frequency bandwidth meets or exceeds the requested amount of communication resources, the conflict manager 128 can recommend approval of the request to the resource manager 126. If an amount of requested communication resources exceeds an amount of available communication resources within the selected frequency bandwidth, the conflict manager 128 may determine if one or more other wireless connections occupying communication resources within the selected frequency bandwidth can be moved to other communication resources. This determination may include comparing the request with other requests received from other user devices. Additionally or alternatively, the conflict manager 128 may recommend allocating communication resources to the user device 102 such that at least a portion of the allocated communication resources are outside of the selected frequency bandwidth. The conflict manager 128 may further determine a proposed alternate frequency bandwidth to the user device 102.

The resource manager 126 allocates, based on one or more of the request and the recommendation of the conflict manager 128, communication resources for communicating with the base station 104 over the wireless connection 106. The base station 104 transmits an associated resource grant indicating the allocation of communication resources via the communication module 130. The communication module 130 includes a hardware-based transceiver that includes a receiver, a transmitter, and associated circuitry or other components for communicating with the user device 102 via the wireless medium. The communication module 130 may be configured to communicate over one or more frequency bandwidths of the wireless medium and over multiple spatial layers and beams. In some cases, the communication module 130 includes, or is coupled with, multiple hardware-based transceivers and antenna arrays that are configured to establish and manage wireless connections with multiple user devices over one or more frequency bandwidths. The base station 104 may communicate, over one or more channels, any suitable data with the user device 102 through the uplink 108 and the downlink 110, such as a schedule of allocated communication resources, downlink pilots, application data, wireless connection status information, or wireless connection control information.

Figure 2:
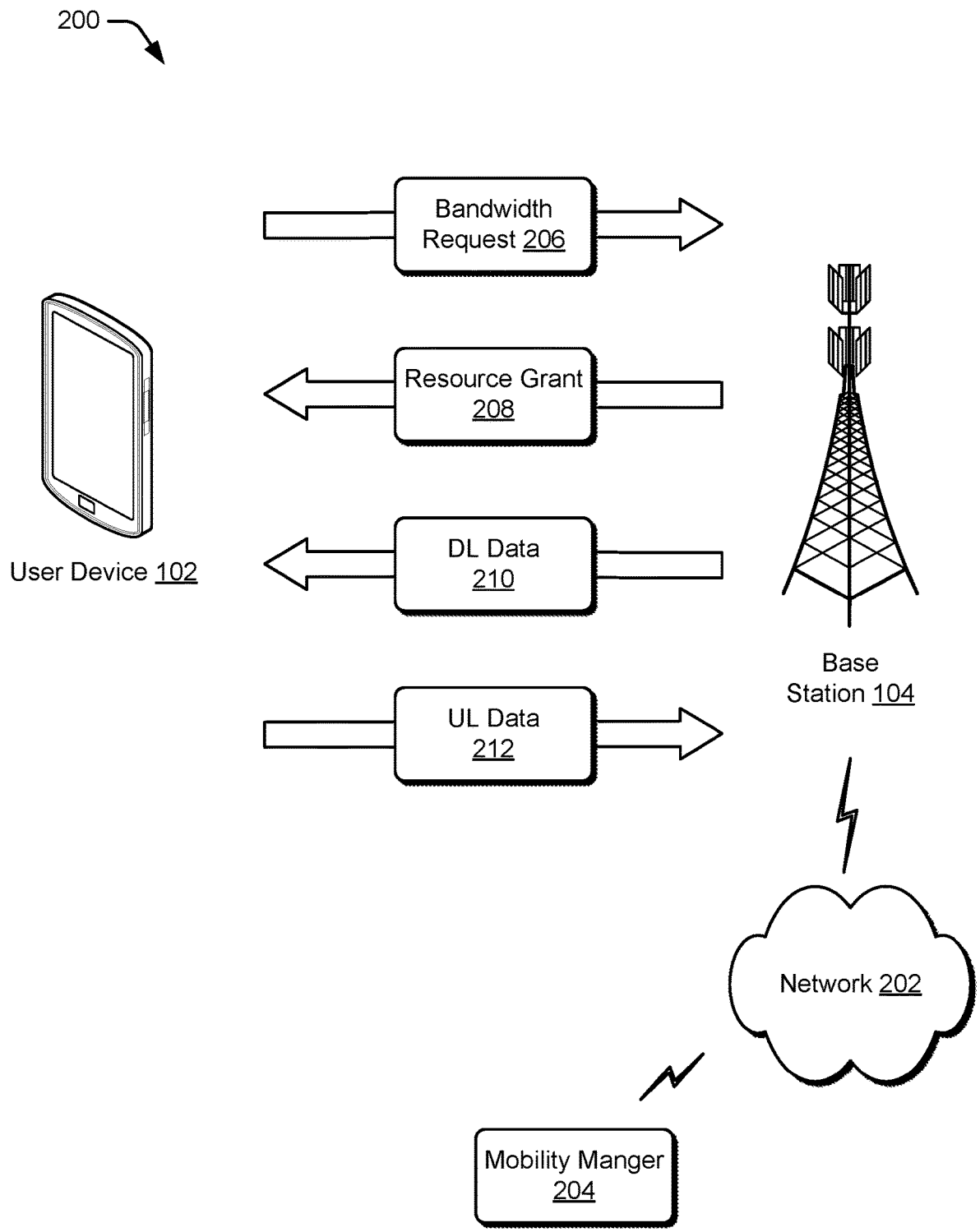
FIG. 2 illustrates an example networking environment in which the user device and base station may communicate in accordance with one or more aspects of user device-initiated bandwidth requests.

FIG. 2 illustrates an example networking environment 200 in which a user device and a base station may communicate in accordance with one or more aspects of user device-initiated bandwidth requests can be implemented. The network environment includes respective instances of the user device 102 and the base station 104, which provides a wireless network with which the user device 102 and other user devices may associate. Through the wireless network, the base station 104 may enable or provide access to other networks or resources, such as a network 202 (e.g., the Internet) connected via a backhaul link (e.g., fiber network). Additionally or alternately, the networking environment 200 may include other base stations or a mobility manager 204, such as a mobility management entity (MME) or an access and mobility management function (AMF), to provide an area wide wireless network, such as a 5G NR network and associated data services.

In this example, the user device 102 transmits, to the base station 104, a frequency bandwidth request 206. For example, the frequency bandwidth request 206 may be transmitted over a channel of the wireless connection 106, such as a PUCCH or a PRACH. The frequency bandwidth request 206 may include a duration of time for which the user device 102 requests to communicate over the requested frequency bandwidth. For example, the frequency bandwidth request 206 may provide a requested schedule for communicating over wide frequency bandwidths and narrow frequency bandwidths. In some implementations, the frequency bandwidth request 206 may include modifiers based on context, such as location of the user device 102, that the base station 104 can use to modify the frequency bandwidth request 206. For example, the frequency bandwidth request 206 may request to communicate over a frequency bandwidth near 2.4 GHz, to conserve power and reduce thermal effects, except when the device 102 is at a home or workplace of a user.

Based on the frequency bandwidth request 206, the base station 104 compares the frequency bandwidth request 206 with an availability of communication resources within a selected frequency bandwidth. The base station 104 then transmits a resource grant 208 to the user device 102. The base station 104 may transmit the resource grant 208 within a DCI message. Further, the base station 104 may transmit the resource grant 208 directly, such as over a PDCCH of the wireless connection 106, or indirectly, such as over another wireless connection via another radio access technology. The resource grant 208 may further confirm or reject other requests within the frequency bandwidth request 206, such as a hopping pattern, a schedule for changing an amount of allocated communication, or a schedule for changing a location of the allocated communication resources.

The base station 104 transmits downlink (DL) data 210 to the user device 102 over the downlink communication resources identified in the resource grant 208. The base station 104 may transmit the downlink data 210 over a channel of the wireless connection 106 such as a PDSCH or a PDCCH. The user device 102 transmits uplink (UL) data 212 to the base station 104 over the uplink communication resources identified in the resource grant 208.

Figure 3:
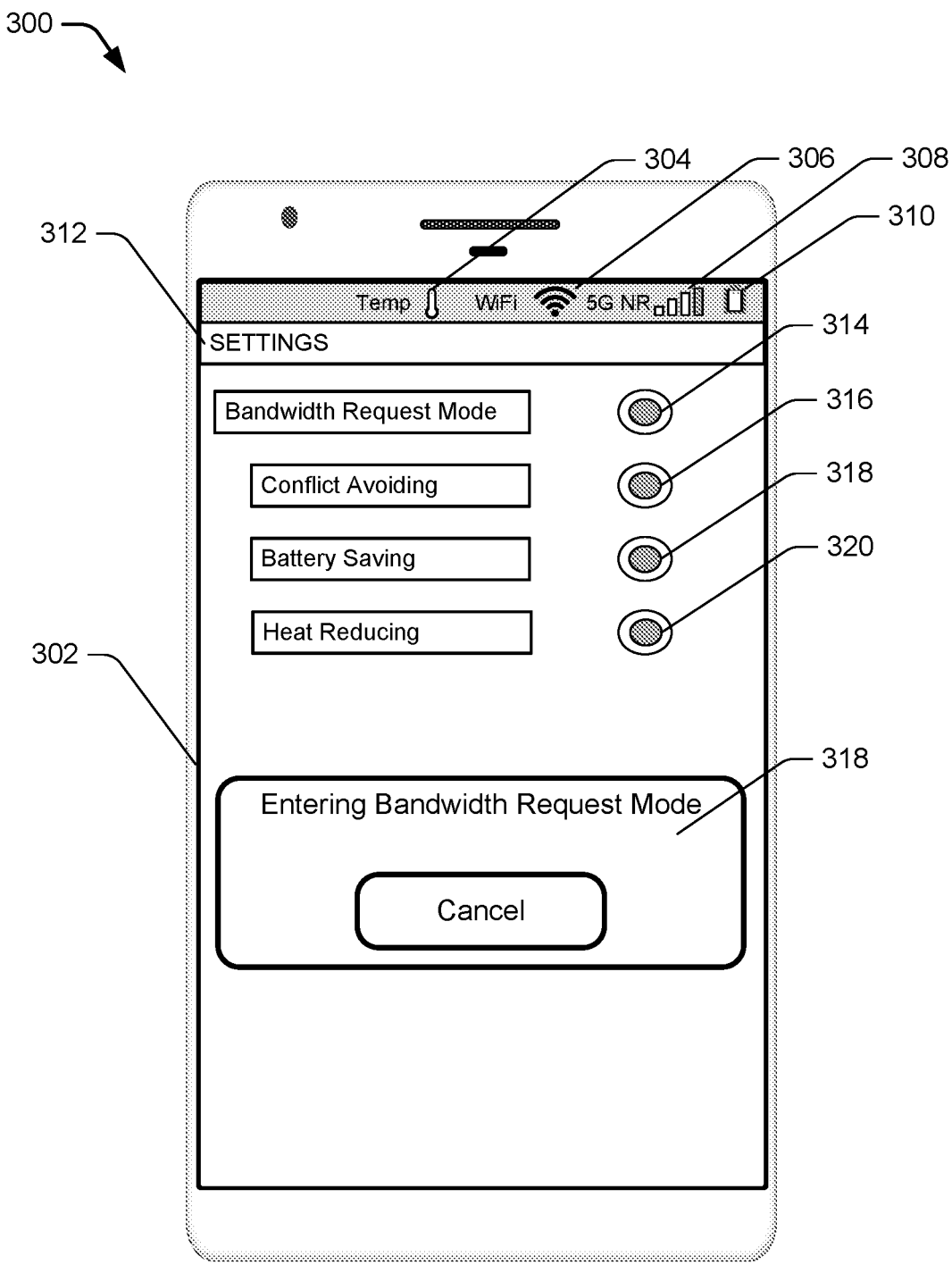
FIG. 3 illustrates an example user interface of the user device in accordance with one or more aspects of user device-initiated bandwidth requests.

FIG. 3 illustrates an example user interface 300 of an instance of the user device 102 through which one or more aspects of user device-initiated bandwidth requests can be implemented. In this example, the user interface 300 is presented through a visible portion of a display 302 for providing output to a user. The display 302 may also include, or be integrated with, a touch screen or touch-sensitive overlay for receiving touch input from the user. The display 302 may also display one or more of a thermal status indicator 304 of the device (shown as "temp"), an indicator 306 of another wireless connection of the user device 102, an indicator 308 of the wireless connection 106 (shown as 5G NR), or a power status indicator 310. In the context of user device-initiated bandwidth requests, the indicators 304, 306, 308 and 310 represent one or more of the findings of the communication conditions monitor 116. For example, the communication conditions monitor 116 detects that an environmental condition includes wireless signals to or from a WiFi provider. Additionally, the communication conditions monitor 116 may detect a high temperature as indicated by the thermal status indicator 304 or a high battery charge level as indicated by the power status indicator 310.

In some implementations, the display 302 provides or makes accessible a settings menu 312 through which the user interface 300 can receive input 314 to select a bandwidth request mode. The settings menu 312 can receive additional an inputs 316, 318, and 320 to select one or more modes for user device-initiated bandwidth requests. The inputs 316, 318, and 320 select example modes including conflict avoiding, battery saving, and heat reducing modes, respectively. These inputs 314, 316, 318, and 320 may be included as internal conditions identified in the frequency bandwidth request 206.

Additionally or alternatively, the user device 102 may provide a notification 322 via the user interface 300 to indicate that the user device 102 is entering the bandwidth request mode, based on user input. The notification 322 is illustrated in this example as a pop-up notification in the display 302, however, other forms of the notification 322 may be implemented in addition or in alternative to the pop-up notification. For example, the user device 102 may provide an audible notification, a visible notification via a light emitting diode (LED) indicator that is separate from the display 302, or a motion-based notification such as a vibration of the user device 102.

The user interface 300 is but one of many possible user interfaces for implementing user device-initiated bandwidth requests. Although the user device 102 is illustrated as a smart phone with a touch screen, alternative user interfaces may be implemented by the user device 102. For example, the user device 102 may be implemented as a laptop with a user interface. The user interface of the laptop may include, for example, one or more of a mouse, a track pad, a keyboard, a microphone, a monitor, a projector screen, or speakers. In some implementations, the user interface does not include the settings menu 312 for receiving the inputs 314, 316, 318, or 320, but rather, the user device 102 enters the bandwidth request mode automatically and without receiving user input.

Figure 4:
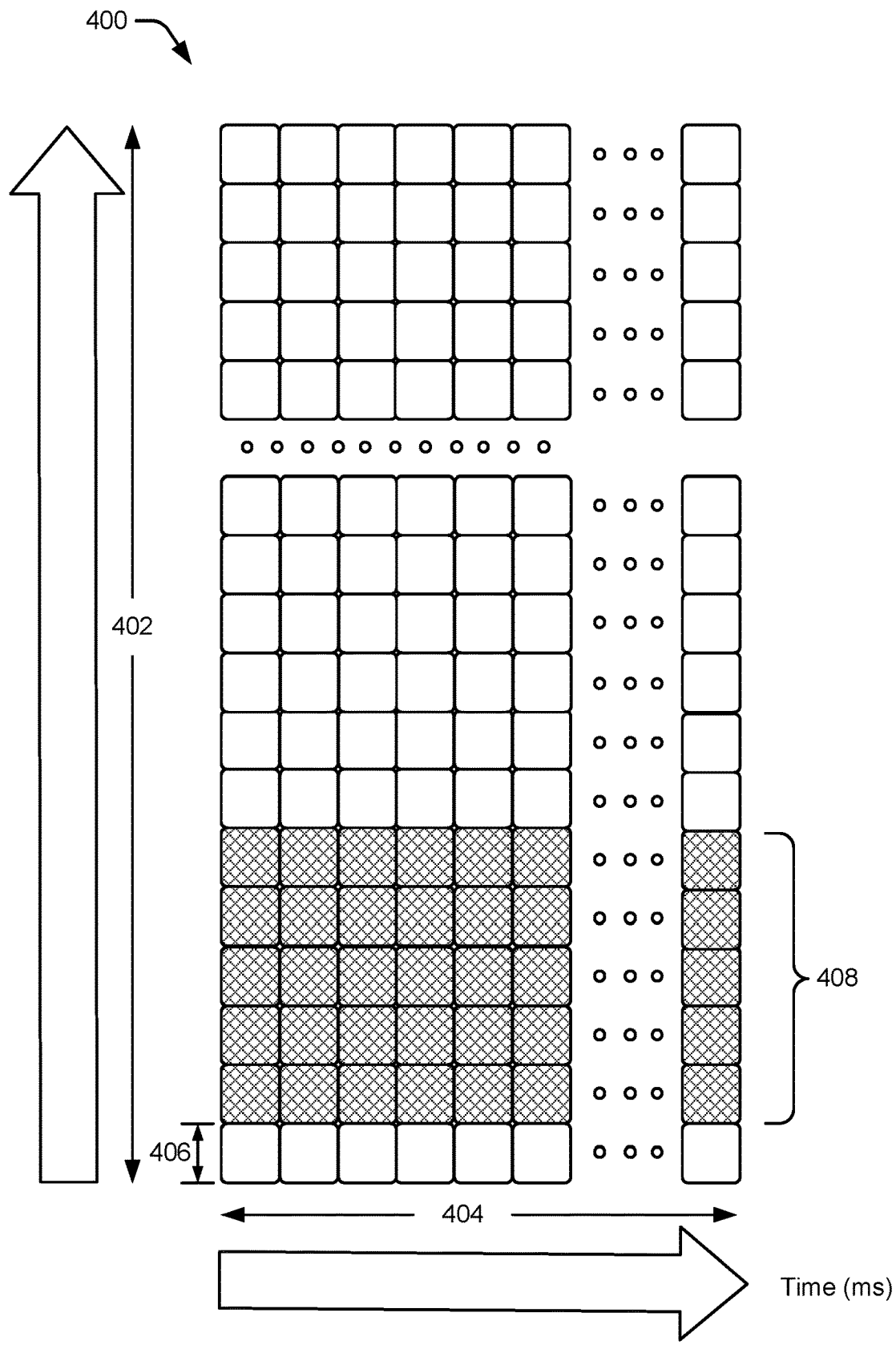
FIG. 4 illustrates example communication resources available for communication between the user device and the base station.

FIG. 4 illustrates an example set 400 of communication resources available to the base station 104 for communicating with user devices. The communication resources of the set 400, available to the base station 104 for communicating with associated user devices, span a frequency bandwidth 402 and a time interval 404. The communication resources span a frequency bandwidth 406 that is a portion of the frequency bandwidth 402 of the set 400. The frequency bandwidth 406 may be dynamically determined by the base station 104 and may vary for different communication resources of the set 400.

The communication resources, shown as boxes, may be resource blocks, groups of resource blocks, groups of resource elements, orthogonal frequency-division multiplexing (OFDM) symbols, single-carrier frequency-division multiplexing (SC-FDM) symbols, or other denominations of communication resources. A frequency bandwidth 408 is allocated by the base station 104 for the wireless connection 106 with the user device 102. For purposes of this discussion, the frequency bandwidth 408 may be referenced as a standard frequency bandwidth or an initial resource grant for the wireless connection 106.

Figure 5:
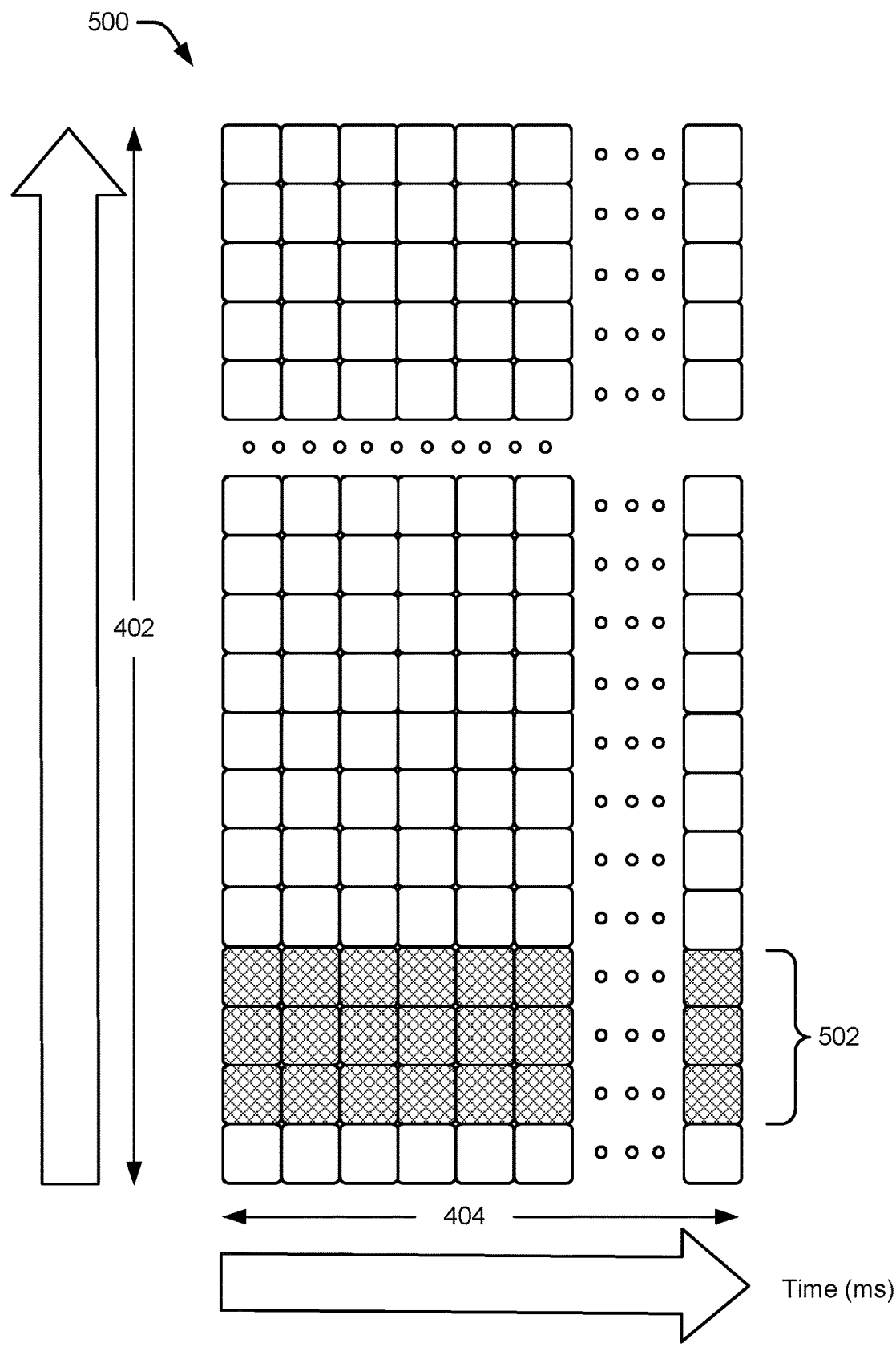
FIG. 5 illustrates other example communication resources available for communication between the user device and the base station.

FIG. 5 illustrates another example set 500 of communication resources available to the base station 104 for communicating with user devices. The set 500 may be included in the frequency bandwidth request 206 indicating a request to reduce a quantity of communication resources, or to narrow a frequency bandwidth, for the wireless connection 106. As discussed herein, the user device 102 may request a frequency bandwidth 502 to reduce a quantity of communication resources for the wireless connection 106 based on determined conditions related to the wireless connection. For example, the user device 102 may determine one or more conditions such as a high-temperature thermal status, a low-charge power state, a small amount of data to transmit, or a voice-call type of data to transmit.

Although shown as spanning three communication resources to illustrate a relatively narrow frequency bandwidth, the frequency bandwidth 502 may span any number of communication resources. Also, the frequency bandwidth 502 may be any fraction of the standard frequency bandwidth. Further, the frequency bandwidth request 206 may include a request for fewer than all communication resources in the frequency bandwidth 502.

In alternative implementations, the frequency bandwidth request 206 may include a request for an increased frequency bandwidth, based on a large amount of data to be communicated with the base station 104, and an increased quantity of communication resources. In other implementations, the frequency bandwidth request 206 may include a request for an allocation of communication resources outside of the frequency bandwidth 502.

Figure 6:
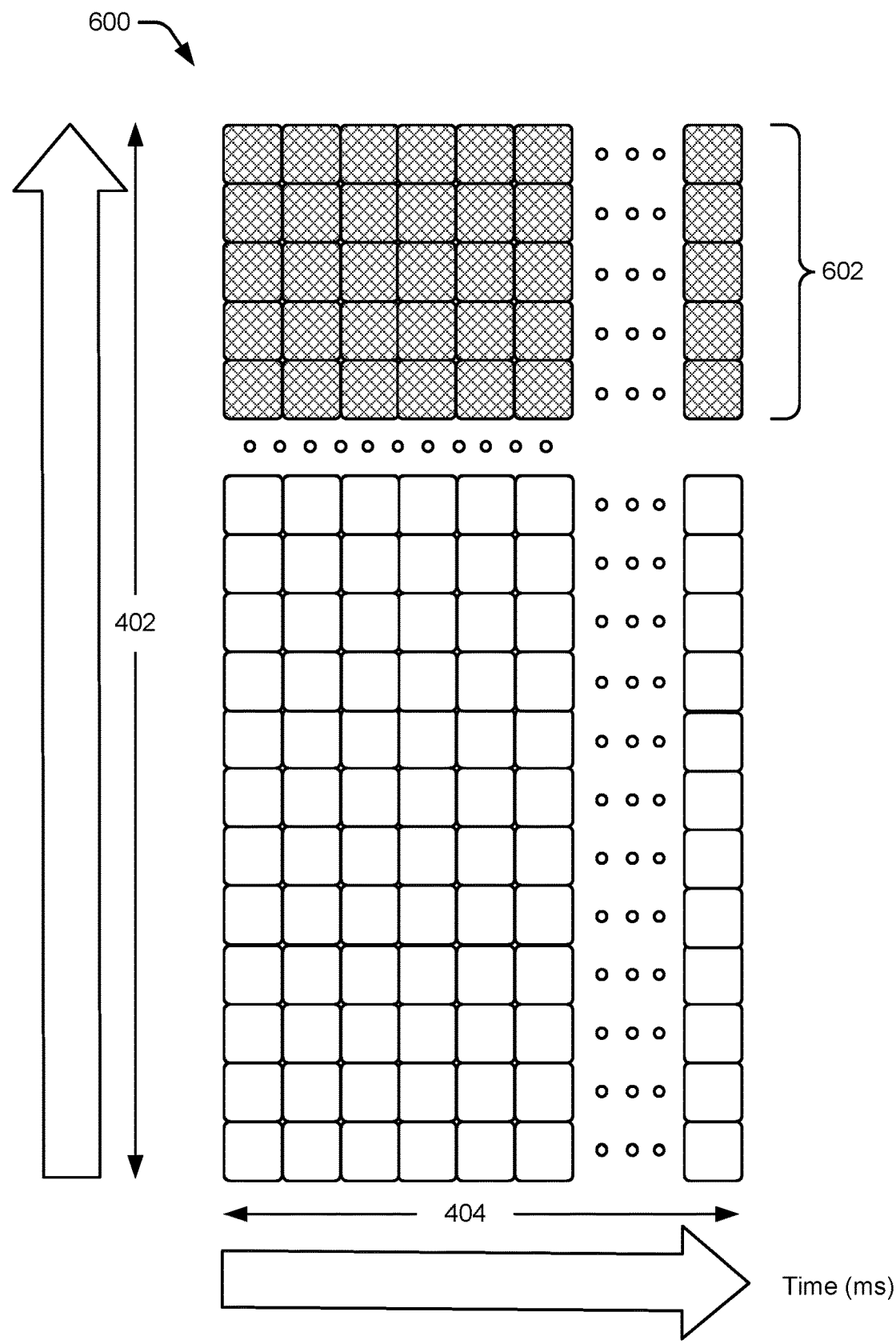
FIG. 6 illustrates other example communication resources available for communication between the user device and the base station.

FIG. 6 illustrates another example set 600 of communication resources available to the base station 104 for communicating with user devices. The set 600 may be included in the frequency bandwidth request 206 indicating a request to choose, or change to, a frequency-location of the set 600 for the wireless connection 106. As discussed herein, the user device 102 may request a particular frequency bandwidth 602 to reduce conflicts with other wireless signals detected by the user device 102. Additionally or alternatively, the user device 102 may request a particular frequency bandwidth 602 based on a thermal status or a power status of the user device 102. In some implementations, the user device 102 requests an amount of communication resources in addition to a frequency-location of the frequency bandwidth 602.

Techniques for User Device-Initiated Bandwidth Requests

Figure 7:
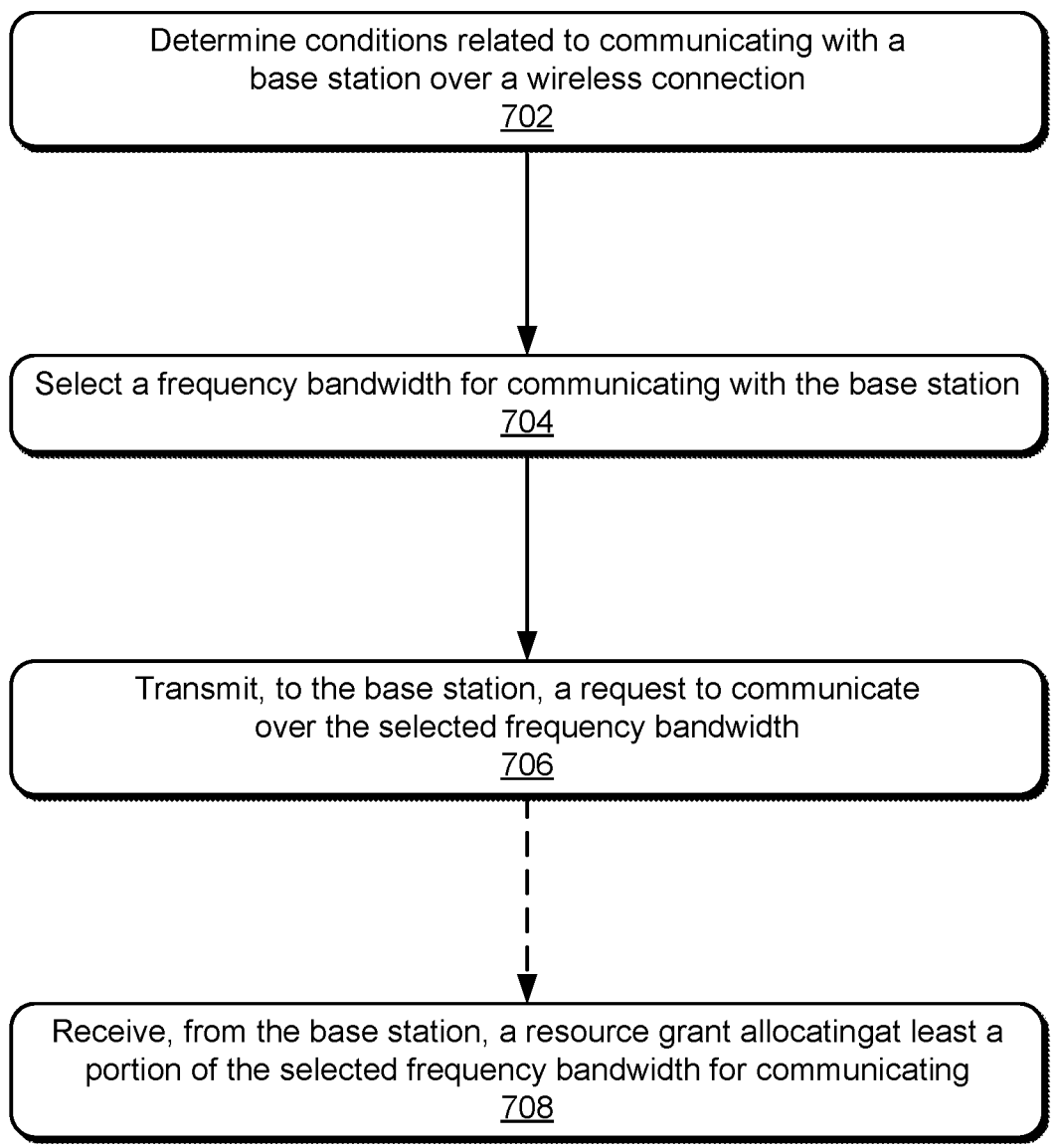
FIG. 7 illustrates an example method performed by the user device for user device-initiated bandwidth requests.
Figure 8:
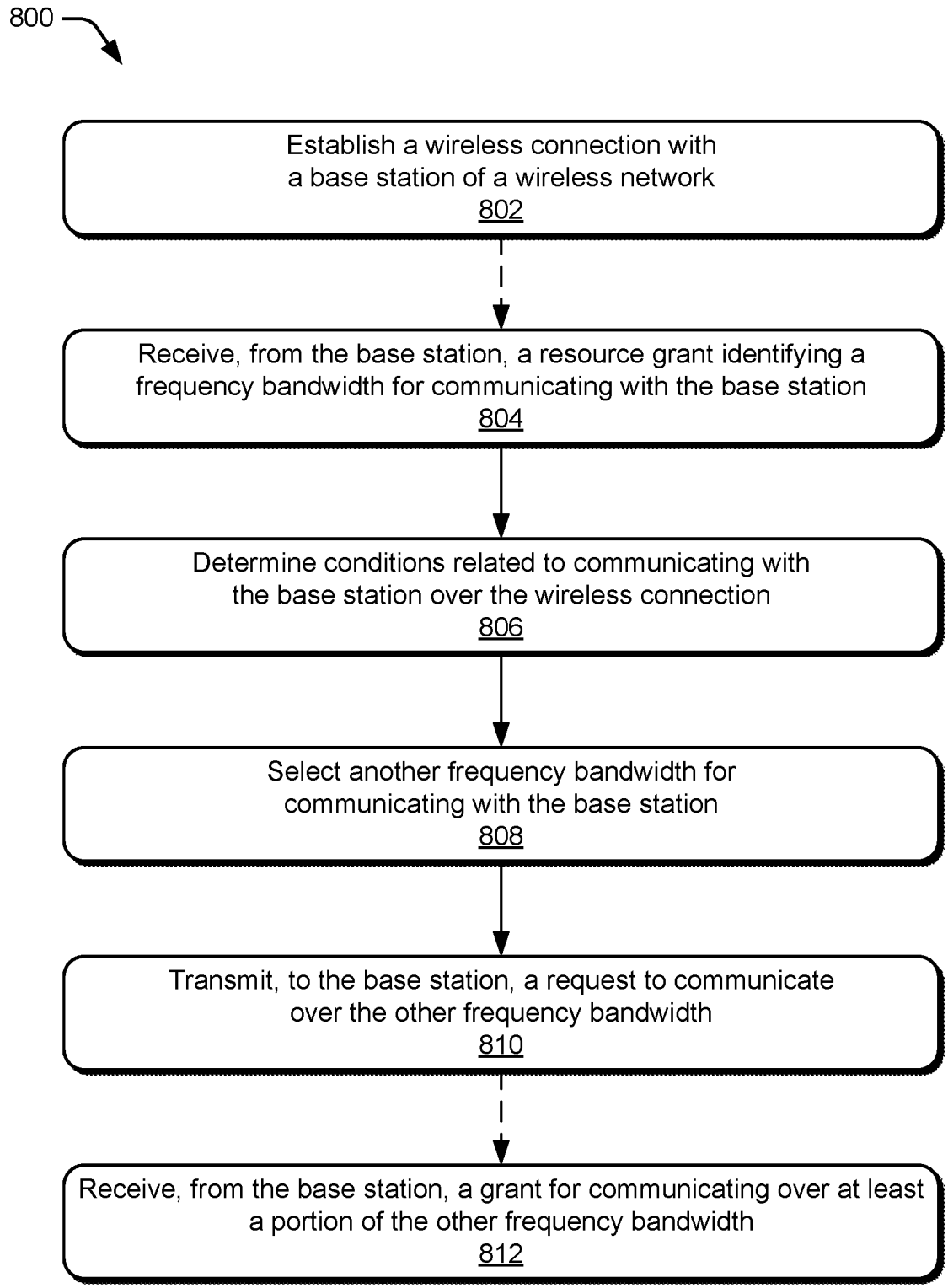
FIG. 8 illustrates another example method performed by the user device for user device-initiated bandwidth requests.
Figure 9:
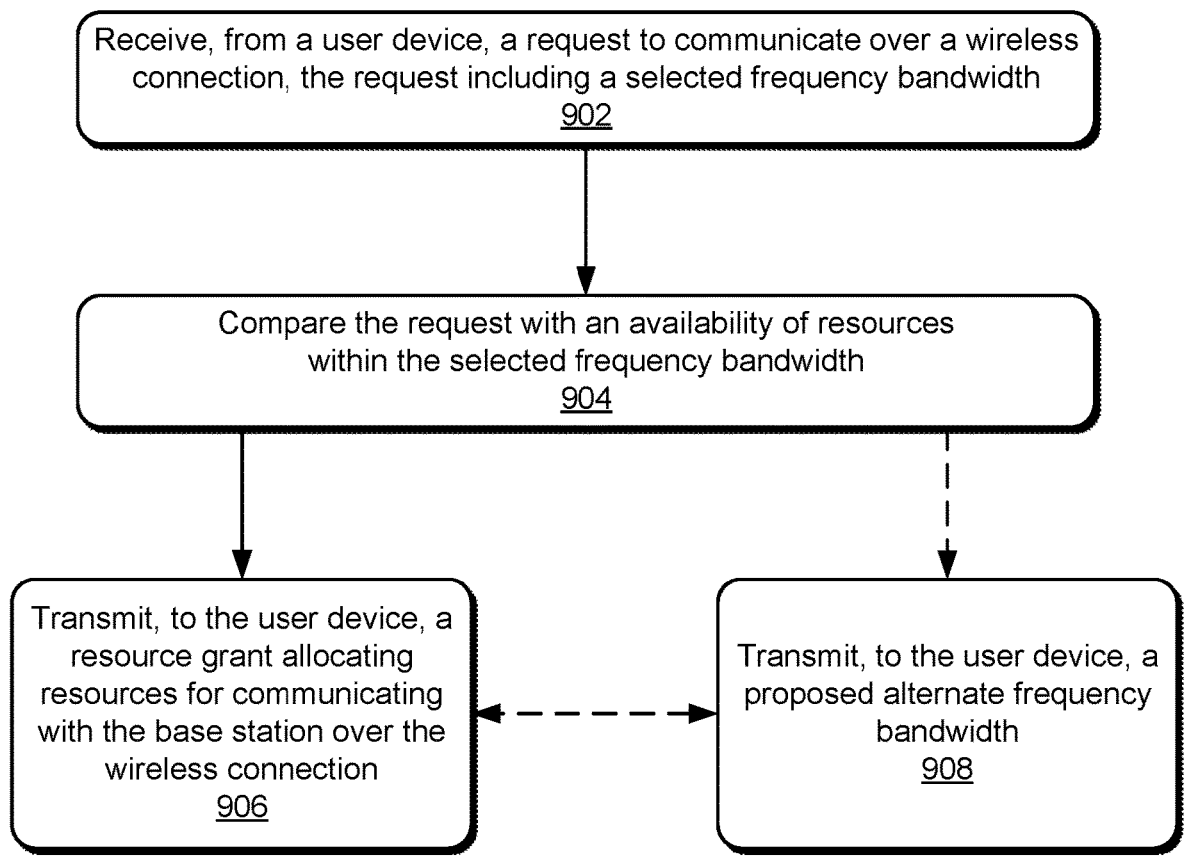
FIG. 9 illustrates another example method performed by the base station for user device-initiated bandwidth requests.

FIGS. 7-9 depict methods for implementing user device-initiated bandwidth requests. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-6, reference to which is made for example only. The techniques are not limited to performance by one entity or multiple entities operating on one device, or those described in these figures.

FIG. 7 illustrates an example method 700 performed by a user device for user device-initiated bandwidth requests. The method 700 includes operations that may be performed by a communication conditions monitor, such as the communication conditions monitor 116, a bandwidth selector, such as the bandwidth selector 118, and a communication module, such as the communication module 120. In some aspects, operations of the method 700 may improve an experience at the user device 102 by allowing the user device 102 to influence a frequency bandwidth allocation better suited for communication over the wireless connection 106.

At operation 702, the user device determines conditions related to communicating with a base station over a wireless connection. For example, the user device 102 detects one or more conditions such as internal conditions or environmental conditions that influence a quality of the wireless connection or performance of the user device 102 while communicating over the wireless connection 106.

At operation 704, the user device selects a frequency bandwidth for communicating with the base station. The selecting is based on the determined conditions. For example, the user device 102 selects the frequency bandwidth 502 based on detecting a low-battery power status.

At operation 706, the user device transmits, to the base station a request to communicate over the selected frequency bandwidth. For example, the user device 102 transmits the frequency bandwidth request 206 to the base station 104. The frequency bandwidth request 206 may include one or more of a requested amount of communication resources, a frequency-location of a preferred frequency bandwidth, or requested communication configurations for the wireless connection 106.

At optional operation 708, the user device receives, from the base station, a resource grant allocating at least a portion of the selected frequency bandwidth for communicating over the wireless connection. For example, the user device 102 receives the resource grant 208 identifying at least a portion of the selected frequency bandwidth 502 for communicating over the wireless connection 106.

FIG. 8 illustrates an example method 800 performed by a user device for user device-initiated bandwidth requests. The method 800 includes operations that may be performed by a communication conditions monitor, such as the communication conditions monitor 116, a bandwidth selector, such as the bandwidth selector 118, and a communication module, such as the communication module 120. The method 800 describes a method of requesting a change to a frequency bandwidth allocated by the base station 104. In some aspects, operations of the method 800 may improve an experience at the user device 102 by allowing the user device 102 to request a change to a frequency bandwidth allocation better suited for communication over the wireless connection 106.

At optional operation 802, the user device establishes a wireless connection with a base station of a wireless network. For example, the user device 102 establishes the wireless connection 106 with the base station 104 via an access request and response over the PRACH and the PDCCH.

At operation 804, the user device receives, from the base station, a resource grant identifying a frequency bandwidth for communicating with the base station. For example, the user device 102 receives, from the base station 104, a resource grant identifying communication resources within the frequency bandwidth 408 for communicating via the wireless connection 106.

At operation 806, the user device determines conditions related to communicating with the base station over the frequency bandwidth identified in the resource grant. For example, the communication conditions monitor 116 of the user device 102 detects potentially interfering wireless signals, not included in the wireless connection 106, at or near a frequency-location of the frequency bandwidth identified in the resource grant.

At operation 808, the user device selects another frequency bandwidth for communicating with the base station. The user device selected the other frequency bandwidth based on the determined conditions. For example, the bandwidth selector 118 of the user device 102 selects the frequency bandwidth 602 for communicating with the base station 104.

At operation 810, the user device transmits, to the base station, a request to communicate over the other frequency bandwidth. For example, the user device 102 transmits the frequency bandwidth request 206 to the base station 104 to request the frequency bandwidth 602 for communicating with the base station 104.

At optional operation 812, the user device receives, from the base station, a resource grant allocating at least a portion of the selected frequency bandwidth for communicating over the wireless connection. For example, the user device 102 receives the resource grant 208 identifying at least a portion of the selected frequency bandwidth 502 for communicating over the wireless connection 106.

FIG. 9 illustrates an example method 900 performed by a base station for user device-initiated bandwidth requests. The method 900 includes operations that may be performed by a resource manager, such as the resource manager 126, a conflict manager, such as the conflict manager 128, and a communication module, such as the communication module 130. In some aspects, operations of the method 900 may improve an experience at the user device 102 by allowing the user device 102 to influence a frequency bandwidth allocation better suited for communication over the wireless connection 106.

At operation 902, the base station receives, from a user device, a request to communicate over a wireless connection. The request includes a selected frequency bandwidth. For example, the base station 104 receives, from the user device 102, the frequency bandwidth request 206 over one of a PRACH or a PUCCH. The user device 102 may request communicating over the frequency bandwidth 602. The request may also include one or more conditions considered by the user device 102 in selecting the frequency bandwidth 602.

At operation 904, the base station compares the request with an availability of communication resources within the selected frequency bandwidth. For example, the conflict manager 128 compares the frequency bandwidth request 206 with available communication resources within the frequency bandwidth 602.

At operation 906, the base station 104 transmits, to the user device, a resource grant allocating communication resources for communicating with the base station over the wireless connection. The resource grant is based on the request from the user device and the comparison of the request with the availability of communication resources within the selected frequency bandwidth. For example, the base station 104 transmits, to the user device 102, the resource grant 208. The communication resources allocated in the resource grant 208 may include communication resources within the selected frequency bandwidth, if available.

At optional operation 908, the base station transmits, to the user device, a proposed alternate frequency bandwidth. For example, the base station 104 transmits, to the user device 102, a proposal to communicate via a related frequency bandwidth. The base station 104 may propose the alternate frequency bandwidth based on an amount of requested communication resources exceeding an amount of available communication resources within the selected frequency bandwidth.

Although techniques using, and apparatuses for implementing, user device-initiated bandwidth requests have been described in language specific to features and/or methods, it is to be understood that the subject of the appended claims is not necessarily limited to the specific features or methods described. Rather, the specific features and methods are disclosed as example ways in which user device-initiated bandwidth requests can be implemented.

What is claimed is:

1. A method performed by a user device for user-device-initiated bandwidth requests, the method comprising:
   establishing a wireless connection with a base station of a wireless network;
   receiving a first resource grant from the base station, the first resource grant identifying a first frequency bandwidth for communicating with the base station over the wireless connection;
   determining conditions related to communicating with the base station over the first frequency bandwidth identified in the first resource grant, the conditions including a thermal status of the user device;
   selecting, by the user device and based on the thermal status of the user device, a second frequency bandwidth for communicating with the base station;
   transmitting, to the base station, a request to communicate with the base station over the second frequency bandwidth; and
   receiving a second resource grant from the base station, the second resource grant allowing communication with the base station over the second frequency bandwidth or an alternate frequency bandwidth based on the second frequency bandwidth.

2. The method as recited in claim 1:
   wherein the conditions further include wireless signals detected at the user device, the wireless signals not included in the wireless connection; and
   wherein the selecting the second frequency bandwidth is further based on the wireless signals.

3. The method as recited in claim 1:
   wherein the conditions further include
   a power status of the user device; and
   wherein the selecting the second frequency bandwidth is further based on the power status of the user device.

4. The method as recited in claim 1:
   wherein the conditions further include
   at least one of an amount of data to be transmitted to, or received from, the base station or
   a type of data to be transmitted to, or received from, the base station; and
   wherein the selecting the second frequency bandwidth is further based on the amount or type of data to be transmitted to, or received from, the base station.

5. The method as recited in claim 1, wherein the request includes a requested amount of communication resources within the second frequency bandwidth for communicating with the base station.

6. The method as recited in claim 5, wherein the requested amount of communication resources identifies a requested amount of uplink communication resources and a requested amount of downlink communication resources.

7. The method as recited in claim 1, wherein the user device transmits the request as a radio resource control message or as a medium access control message, the request transmitted over a currently allocated communication resource of the first resource grant, over a physical random access channel of the first resource grant, or over a supplemental uplink of the first resource grant.

8. The method as recited in claim 1, wherein the request includes a requested increasing or a decreasing of communication resources that are allocated to one or both of an uplink or a downlink in the first resource grant.

9. The method as recited in claim 1, wherein the request identifies:
   a requested frequency hopping pattern comprising a change in a location of the second frequency bandwidth; or
   a requested schedule for changing elements of the second frequency bandwidth.

10. The method as recited in claim 1, further comprising communicating with the base station over the wireless connection using the second frequency bandwidth or the alternate frequency bandwidth.

11. The method as recited in claim 1, wherein the second frequency bandwidth is one or more of:
    spaced, in a frequency domain, from the first frequency bandwidth identified in the first resource grant; or
    narrower than the first frequency bandwidth identified in the first resource grant.

12. The method as recited in claim 1, wherein the request identifies a duration of time for which the user device requests to communicate over the second frequency bandwidth.

13. The method as recited in claim 1, wherein the request identifies a location of the second frequency bandwidth within a frequency range of the wireless network.

14. A user device comprising:
    a processor;
    a hardware-based transceiver; and
    a computer-readable storage medium having stored thereon instructions that, responsive to execution by the processor, cause the processor to perform operations comprising:
       receive, via the hardware-based transceiver, a first resource grant from a base station, the first resource grant identifying a first frequency bandwidth for communicating with the base station over a wireless connection;
       determine conditions related to communicating with the base station over the first frequency bandwidth identified in the first resource grant, the conditions including a thermal status of the user device;
       select, based on the thermal status of the user device, a second frequency bandwidth for communicating with the base station;
       transmit, to the base station and via the hardware-based transceiver, a request to communicate over the second frequency bandwidth; and
       receive, via the hardware-based transceiver, a second resource grant from the base station, the second resource grant granting communication with the base station over the second frequency bandwidth or an alternate frequency bandwidth based on the second frequency bandwidth.

15. The user device as recited in claim 14, wherein the second frequency bandwidth is:
    spaced, in a frequency domain, from the first frequency bandwidth identified in the first resource grant; or
    narrower than the first frequency bandwidth identified in the first resource grant.

16. The user device as recited in claim 14, wherein the request identifies a duration of time for which the user device requests to communicate over the second frequency bandwidth.

17. The user device as recited in claim 14, wherein the request identifies a requested hopping pattern for communication over the second frequency bandwidth.

18. The user device as recited in claim 14, wherein the request identifies a location of the second frequency bandwidth within a frequency range of the wireless connection.

19. A base station of a wireless network comprising:
a processor;
a hardware-based transceiver; and
a computer-readable storage medium having stored thereon instructions that, responsive to execution by the processor, cause the processor to perform operations comprising:
  establish, via the hardware-based transceiver, a wireless connection with a user device of a wireless network;
  transmit, to the user device and via the hardware-based transceiver, a first resource grant, the first resource grant identifying a first frequency bandwidth for communicating with the base station over the wireless connection;
  receive, from the user device and via the hardware-based transceiver, a request to communicate over the wireless connection using a second frequency bandwidth, the request including a requested amount of communication resources within the second frequency bandwidth for communicating with the base station;
  compare the request with an availability of communication resources within the second frequency bandwidth; and
  responsive to the requested amount of communication resources exceeding the availability of communication resources within the second frequency bandwidth, transmit, to the user device and via the hardware-based transceiver, a second resource grant allocating communication resources within a proposed alternate frequency bandwidth for communicating with the base station over the wireless connection.

20. The base station as recited in claim 19, wherein:
the request identifies a requested amount of uplink communication resources and a requested amount of downlink communication resources; and
the second resource grant is based on the requested amount of uplink communication resources and a requested amount of downlink communication resources.

21. The base station as recited in claim 19, wherein:
the request identifies a thermal status of the user device; and
the second resource grant allocates the alternate frequency bandwidth for communicating with the base station based on the thermal status of the user device.

22. The base station as recited in claim 19,
at least a portion of the communication resources are outside of the second frequency bandwidth.

23. The base station as recited in claim 19, wherein the request identifies a location of the second frequency bandwidth within a frequency range of the wireless network.

* * * * *